(12) United States Patent
Ishii (10) Patent No.: US 6,587,523 B1
(45) Date of Patent: Jul. 1, 2003

(54) RADIO SIGNAL RECEIVING APPARATUS AND A METHOD OF RADIO SIGNAL RECEPTION

(75) Inventor: Tatsuya Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/327,597

(22) Filed: Jun. 8, 1999

(30) Foreign Application Priority Data

Jun. 12, 1998 (JP) ............................................ 10-179834

(51) Int. Cl.[7] ............................................... H04L 27/06
(52) U.S. Cl. ........................ 375/344; 375/326; 375/332
(58) Field of Search ................................. 375/261, 279, 375/280, 281, 283, 316, 326, 327, 329, 330, 332, 344, 354, 371, 375, 376; 455/42, 60, 180.1, 182.2, 192.1, 192.2, 205, 255, 260; 329/304, 306, 307; 327/141, 147, 156; 370/206, 207; 331/1 A, 1 R (56) References Cited

U.S. PATENT DOCUMENTS

| | | | |
|---|---|---|---|
| 5,588,027 A | * 12/1996 | Lim | 375/330 |
| 5,940,450 A | * 8/1999 | Koslov et al. | 375/344 |
| 6,002,721 A | * 12/1999 | Said et al. | 375/261 |
| 6,046,630 A | * 4/2000 | Kim | 329/304 |
| 6,081,563 A | * 6/2000 | Taga et al. | 375/344 |

FOREIGN PATENT DOCUMENTS

| | | | |
|---|---|---|---|
| JP | 07115448 A | * 5/1995 | H04L/27/227 |
| JP | 07297872 A | * 11/1995 | H04L/27/22 |
| JP | A 8-80798 | 3/1996 | |
| JP | 9-107384 | 4/1997 | |
| JP | A9-116994 | 5/1997 | |
| JP | 9-162943 | 6/1997 | |
| JP | 9-168039 | 6/1997 | |
| JP | 9-331307 | 12/1997 | |

* cited by examiner

*Primary Examiner*—Stephen Chin
*Assistant Examiner*—Chieh M. Fan (57) ABSTRACT

A radio signal receiving apparatus and a method of radio signal receiving for improving the receiving characteristic by limit the excessive compensation in the AFC circuit are realized. The base band phasing signal output from the phase detector is input to the AFC unit. In the AFC unit, the base band phasing signal is supplied to two ways, one is supplied to a series processing path of the frequency error detecting part, the integrating equalizing part, the numerical limiting part and the integrator, and another is supplied to the adder. In the former case, the frequency error of the base band phasing signal supplied to the frequency detecting part is detected, the detected frequency error is integrated and equalized for every one symbol in the integrating equalizing part and, after that, the equalized frequency error value is limited within a predetermined range in the numerical limiting part, and finally, the frequency error limited by the numerical limiting part is integrated for every one symbol in the integrator. The integrated frequency error is subtracted from the original base band phasing signal, which is the signal of the latter case, by the adder.

6 Claims, 6 Drawing Sheets

RADIO SIGNAL RECEIVING APPARATUS AND A METHOD OF RADIO SIGNAL RECEPTION

BACKGROUND OF THE INVENTION

1. Field of the Invention

The present invention relates to a radio signal receiving apparatus and a receiving method, and more particularly, to the radio signal receiving apparatus and the receiving method in which receiving characteristics are improved by adding a numerical limit to a phase differential output signal.

2. Description of the Related Art

In Radio Communication, an AFC (Automatic Frequency Controller) unit has been used to compensate for a frequency shift between a modulated signal, transmitted from a transmission side and received at a receiving side, and a signal to be demodulated at the receiving side, and to suppress deterioration of receiving characteristics.

When a signal phase suddenly rotates temporarily affected by a large frequency error, a large interference signal (a noise signal), a fading phenomenon, etc., the conventional AFC unit performs a signal compensation based on the temporary phase rotation of a receiving signal, and it causes an excessive compensation, thereby deteriorating the receiving characteristics of the radio signal receiver.

SUMMARY OF THE INVENTION

The present invention is made in view of such a situation to make it possible to improve the receiving characteristics of the radio signal receiver by applying a numerical limit in the AFC unit.

A radio signal receiving apparatus according to the present invention comprises an AFC (automatic frequency controller) unit for compensating for a frequency error between a frequency used for signal modulation and a frequency to be used for signal demodulation by detecting the frequency error from a modulated signal and limiting the detected frequency error within a predetermined range.

The radio signal receiving apparatus further comprising a phase detector for converting the modulated signal into a base band phasing signal, and the AFC unit detects the frequency error from the base band phasing signal.

Therefore, the AFC unit comprises a frequency error detecting part for detecting the frequency error from the base band phasing signal converted by the phase detector, an integrating and equalizing part for integrating and equalizing the frequency error detected by the frequency error detecting part, and a numerical limiting part for limiting the frequency error integrated and equalized by the integrating and equalizing part within a predetermined range.

Further more, the AFC unit comprises an integrator for integrating the limited frequency error output from the numerical limiting part, and a signal adder for subtracting the output signal of the integrator from the base band phasing signal converted by the phase detector.

In the present invention, the receiving radio signal may be a signal modulated by a π/4 shift DQPSK (Differential Quadrature Phase Shift Keying) modulation system, and the detected frequency error can be limited within a phase shift range between −π/4 and π/4.

A method of radio signal reception according to the present invention is applicable to a radio signal receiving apparatus provided with an automatic frequency controller unit for compensating for a frequency error between a frequency used for signal modulation and a frequency to be used for signal demodulation.

The method comprises converting a received modulated signal into a base band phasing signal; delaying the base band phasing signal by one symbol, and detecting the frequency error based on the difference between the base band phasing signal and the base band phasing signal of one symbol ahead; limiting the detected frequency error within a predetermined range; and subtracting the limited frequency error from the converted base band phasing signal.

DETAILED DESCRIPTION OF PREFERRED EMBODIMENT

An embodiment of the present invention will be described in detail with referring to the accompany drawings.

Figure 1:
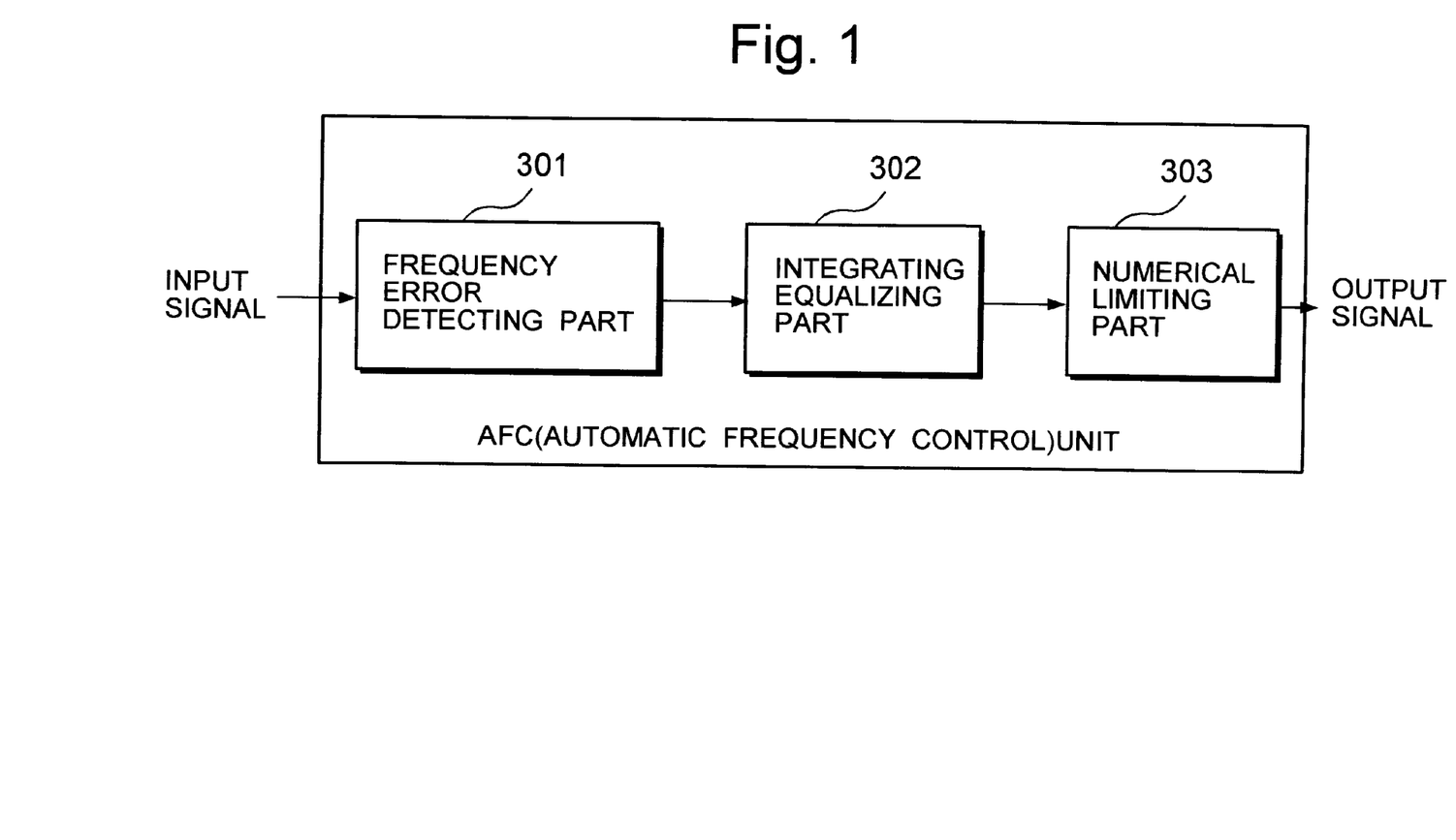
FIG. 1 is a block diagram showing a conceptual configuration of an AFC (Automatic Frequency Controller) circuit of a radio signal receiving apparatus according to the present invention.

FIG. 1 shows a conceptual diagram of an AFC (Automatic Frequency Controller ) circuit of a radio signal receiving apparatus of the present invention. The AFC circuit is a circuit in which it compensates for a frequency difference between a frequency used for signal modulation at a transmission side and a frequency used for signal demodulation at a receiving side in radio communication and suppresses deterioration of receiving characteristics of the radio signal receiver.

As shown in FIG. 1, a frequency error detecting part 301 inputs whatever information available (for example, phase information), detects the frequency error therefrom and outputs it. An integrating equalizing part 302 executes an integrating process and an equalizing process for a value of the frequency error detected by the frequency error detecting part and calculates a frequency offset compensating value suitable for a receiving system and outputs it. A numerical limiting part 303 applies a numerical limit to this output value and, after that, it outputs it.

Next, with reference to FIG. 2, a constitutional example of the signal demodulating block of the radio signal receiving apparatus according to the present invention will be described.

Figure 2:
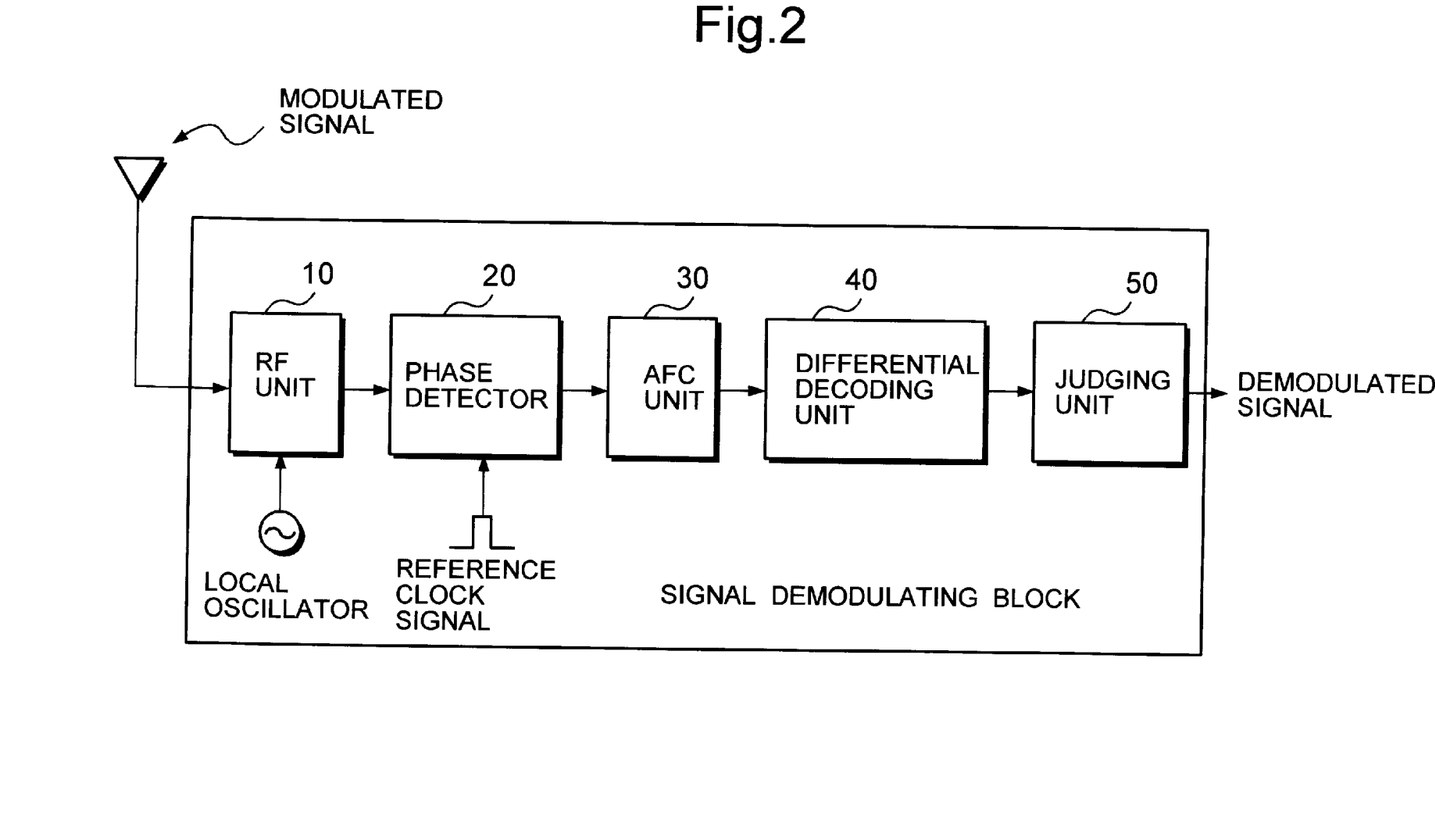
FIG. 2 is a block diagram showing the constitutional example of the signal demodulating block of the radio signal receiving apparatus according to the present invention.

In FIG. 2, a RF (Radio Frequency) unit 10 steps down a signal frequency received through an antenna to an intermediate frequency (IF signal). A phase detector 20 generates a base band signal from the IF signal supplied from the RF unit 10. An AFC unit 30 compensates for a phase shift due to the frequency error of the base band signal supplied from the phase detector 20. A differential decoding unit 40 executes a differential decoding for the signal supplied from the AFC unit 30. A judging unit 50 executes a judging process for the signal from the differential decoding unit 40.

Next, the operation of the signal demodulating block will be described. A modulated signal received from the antenna is supplied to the RF unit 10, mixed down with a signal from a local oscillator in the RF unit 10 and stepped down to the IF signal. Next, the IF signal is supplied to the phase detector 20 and converted to the phasing signal (the base band signal) of the base band based on a reference clock signal. Here, the reference clock signal used when the base band signal is generated (for sampling) should be a clock signal in which a bit synchronization is established.

The phasing signal converted into the base band signal is supplied to the AFC unit 30 and, in the AFC unit 30, a phase shift due to the frequency error is compensated. After that, it is supplied to the differential decoding unit 40 and, after differential-decoded, it is judged in the judging unit 50 and demodulated.

Figure 3:
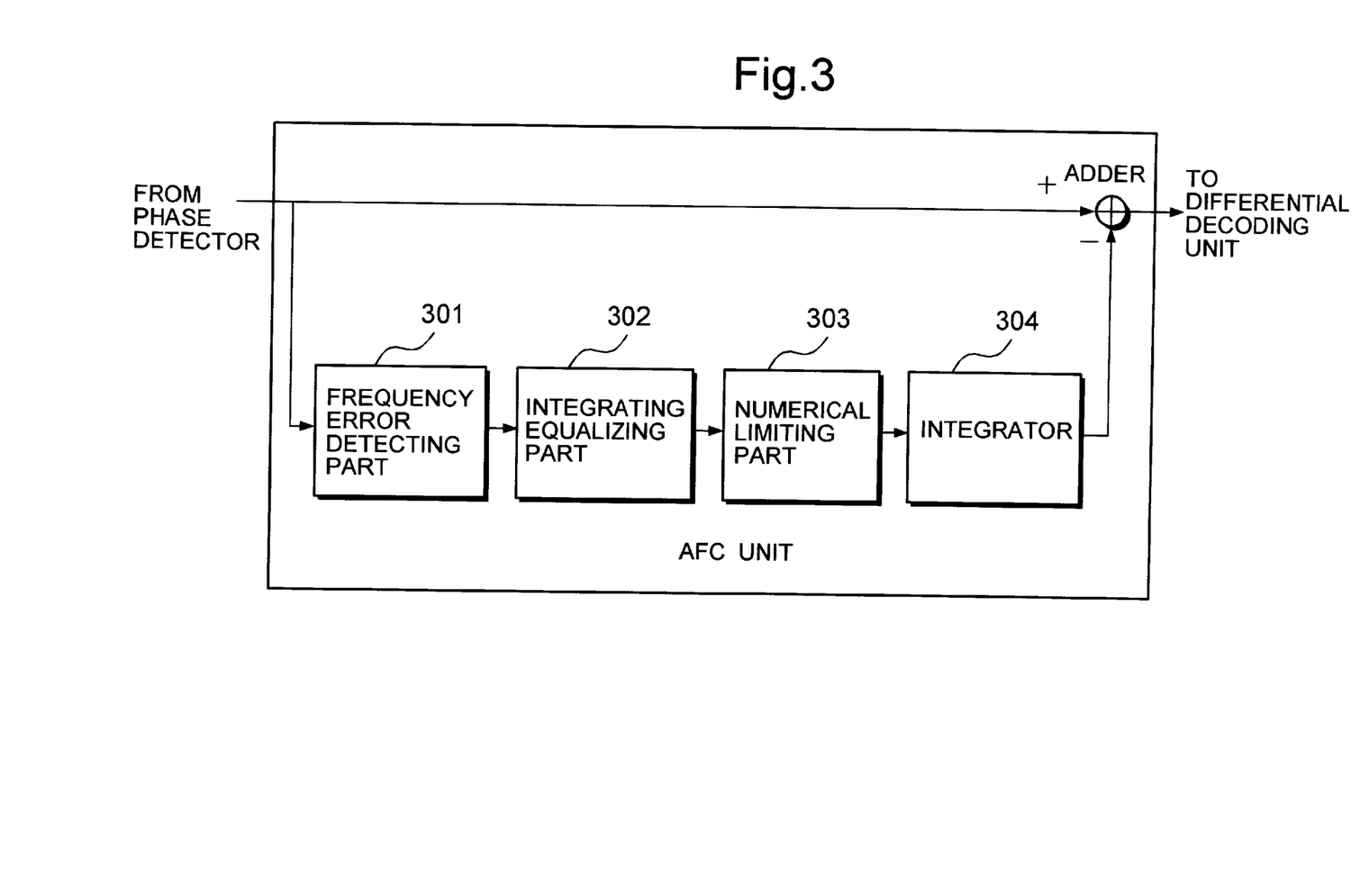
FIG. 3 is a block diagram showing the constitutional example of the AFC unit shown in FIG. 2.

Next, the constitution and the operation of the AFC unit 30 will be described. FIG. 3 shows a constitutional example of the AFC unit 30 shown in FIG. 2. In FIG. 3, a circuit as shown in FIG. 1 is arranged in an open-loop type and added with an integrator 304 so as to adapt a calculated frequency error compensating signal to this receiving system.

The frequency error detecting part 301 detects a frequency error component from the base band phasing signal supplied from the phase detector 20 and supplies a frequency error signal corresponding to the frequency error component to the integrating equalizing part 302. The integrating equalizing part 302 integrates and equalizes the frequency error signal supplied from the frequency error detecting part 301 and supplies an equalized frequency error signal to a numerical limiting part 303.

The numerical limiting part 303 applies a numerical limit to the frequency error signal supplied from the integrating and equalizing part 302. The integrator 304 executes an integration for the frequency error signal numerically limited which is supplied from the numerical limiting part 303 by every one symbol. The integrated signal, i.e. the frequency error compensating signal is subtracted from the original base band phasing signal in the adder and the subtracted result is output.

Here, the numerical limiting part 303 applies the numerical limit to the frequency error signal supplied from the integrating and equalizing part 302. The detailed operation of the AFC unit 30 including the numerical limit will be described hereafter. Note that, since the present invention relates to this AFC unit 30, other units of the demodulating block (the RF unit, the phase detector, the differential decoding unit and the judging unit) are not particularly specified.

Figure 4:
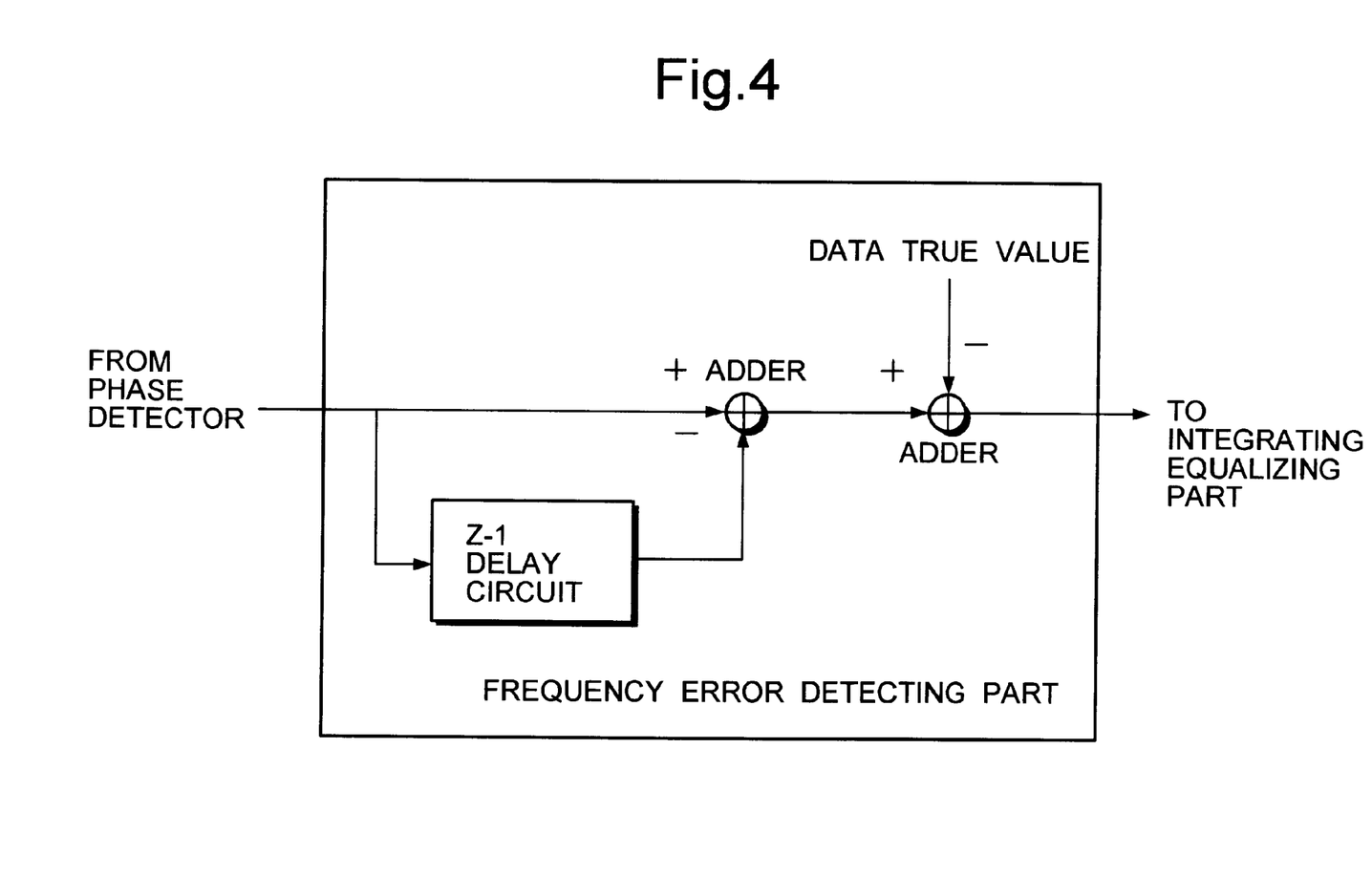
FIG. 4 is a block diagram showing the constitutional example of the frequency error detecting part shown in FIG. 3.
Figure 6:
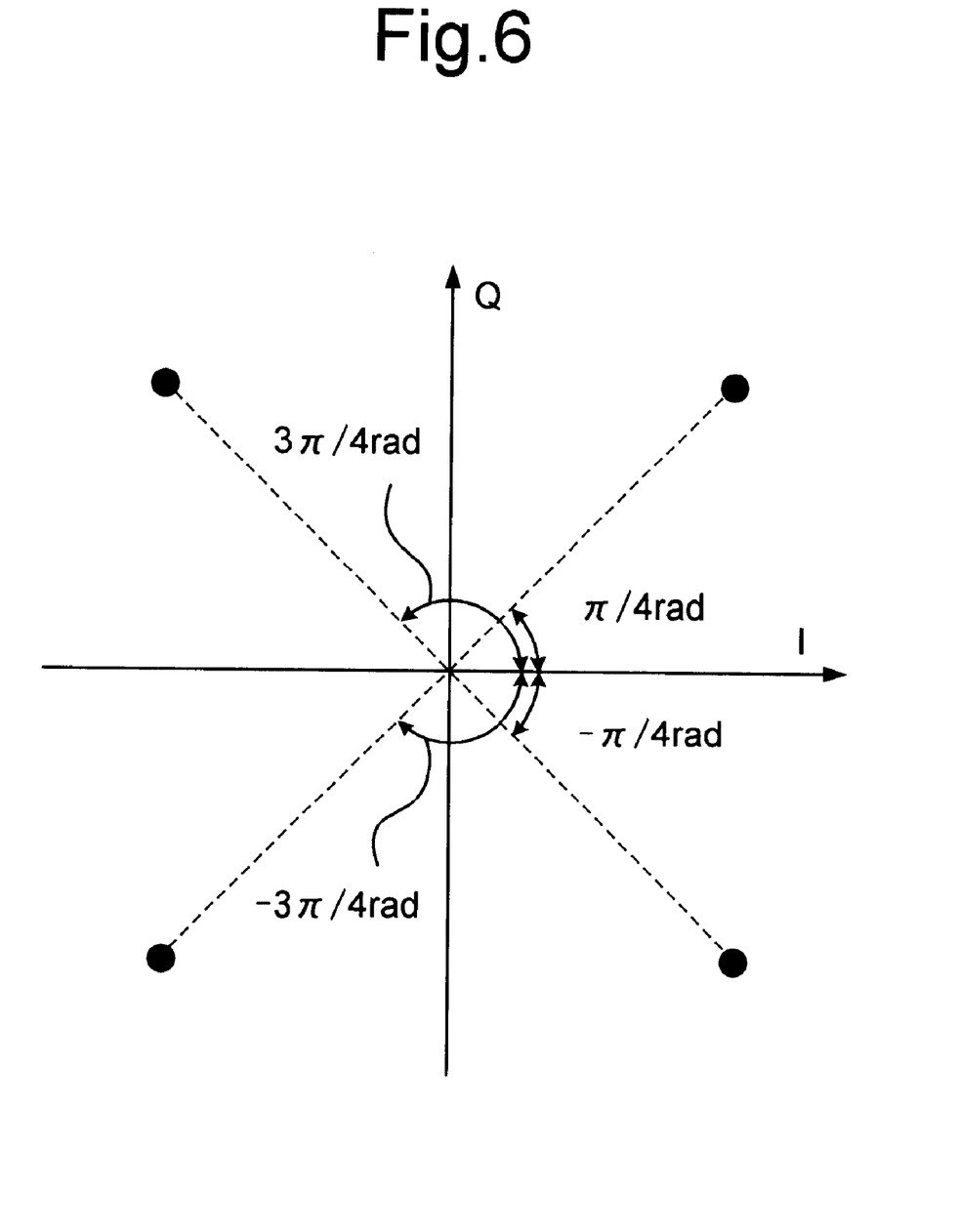
FIG. 6 is a diagram for explaining the π/4 shift DQPS phase point.

Next, the operation of the AFC unit shown in FIG. 3 will be described in details with reference to the FIG. 4 and FIG. 6. FIG. 4 shows the constitutional example of the frequency error detecting part 301 of the AFC unit shown in FIG. 3. A delay circuit (shown as Z-1) delays the input base band phasing signal by one symbol only and, after that, it outputs it. An adder calculates from the input base band phasing signal the difference with the signal of one symbol ahead supplied through the delay circuit and outputs a phase differential signal. Another adder subtracts an intrinsic value (in this case, the phase [data true value] of four phase points as shown in FIG. 6 which is a phase most close to the phase of the phase differential signal among $\pm\pi/4, \pm 3\pi/4$) from the phase differential signal supplied from the adder and calculates an offset.

First, the difference with the base band phasing signal of one symbol ahead is derived for the input base band phasing signal. In FIG. 4, Z-1 means a one symbol delay.

It is assumed that the modulation system of radio signal receiving apparatus of this embodiment is a $\pi/4$ shift DQPSK (Differential Quadrature Phase Shift Keying) system. Therefore, one symbol differential signal, i.e. a phase point of the signal representing the difference between the input base band phasing signal and the base band phasing signal of one symbol ahead is possible only four points ($\pm\pi/4, \pm 3\pi/4$) as shown in FIG. 6 supposing that there is no affect at all by a noise signal or a fading phenomenon.

The time differential of a phase is a frequency. Therefore, if a certain difference exists between the frequency at the transmission side and the frequency at the receiving side (between the signal frequency of the local oscillator used for modulation and the signal frequency of the local oscillator used for demodulation), a certain offset appears in the phase differential signal.

For example, if there is the frequency error of one kilo-hertz (KHz), the phase thereof shifts by one rotation ($2\pi$ radian [rad]) for 1/1 k second(s). This means that the phase shifts by 1/192 rotations ($2\pi/192$ rad [about two degrees]) at a time for one symbol (1/192K[S]) of signal. In other words, the offset of $2\pi/192$ rad is applied on the phase differential signal. For this reason, the above offset can be calculated by subtracting the intrinsic value (in this case, $\pm\pi/4, \pm 3\pi/4$) from the phase differential signal.

The frequency difference (the above offset) detected in this way is integrated and equalized for a certain number of symbols in the integrating equalizing part 302 so as to reduce the affect by a white noise. As is evident from the consideration of the example as mentioned above, even if there is a frequency offset of 1 KHz with a white noise added further, an output frequency error differential signal should converge on $2\pi/192$ rad when a sufficiently long time is equilibrated.

Next, the numerical limit is applied to the equilibrated frequency error signal by the numerical limiting part 303. In the above embodiment, the frequency error signal is limited within a range of $-\pi/4$ to $+\pi/4$ so as not to cause the compensation exceeding a quadrant. In other words, if the input of the numerical limiting part 303 is x and the output thereof is y, $y=-\pi 4$ (provided that $x \leq -\pi/4$)

$y=x$ (provided that $-\pi/4 < x < \pi/4$)

$y=\pi/4$ (provided that $\pi/4 \leq x$)

are established.

In the case of the example as mentioned above, since $-\pi/4 < (2\pi/192) < \pi/4$, $2\pi/192$ is output as it is as the frequency error signal. In a certain case, when there is, for example, the frequency error exceeding 24 KHz, an absolute value of x exceeds $\pi/4$ and consequently the numerical limit is applied. This should not be possible to occur in view of specifications. In reality, however, there are some cases where the absolute value of the input value x exceeds $\pi/4$ affected by a noise signal or a fading phenomenon and, in such case, this numerical limit exhibits an advantageous effect.

Lastly, in the integrator 304, the integration is executed by every one symbol for the frequency error signal after the numerical limit is applied by the numerical limiting part 303, and the integrated signal is output. This signal is subtracted from the original base band phasing signal.

Here, the meaning of the integrator 304 will be described. In the above embodiment, a phase amount shifted by the frequency error for one symbol period is derived. However, the shift of the original base band phasing signal increases for every one symbol and the shift thereof is accumulated. For this reason, the phase amount shifted for one symbol period is integrated for every one symbol and then output as the frequency error compensating signal. And, by subtracting the output (the frequency error compensating signal) from the original base band phasing signal, a phase shift component due to the frequency error has to be eliminated. For this purpose, the integrator 304 is provided.

In the above example, the value after the numerical limit is applied was $2\pi/192$. This is output for every one symbol as $2\pi/192$, $4\pi/192$, $6\pi/192$ . . . and subtracted from the original signal.

Thus, in the above embodiment, the following effects can be obtained. The first effect is that the receiving characteristics can be improved when the receiving condition is bad affected by the influence of a fading phenomenon, a noise signal, etc. or when the frequency error is a large amount. The reason is that when the frequency error is large and a noise is also large or when the phase suddenly rotates temporarily due to the fading phenomenon, etc. an excessive compensation by the AFC unit can be limited by applying a limit to the frequency error signal of the AFC unit and the receiving characteristics can be improved comparing to the time when an output value is not limited. In reality, in the above described embodiment, since an error not less than $\pi/4$ rad (equivalent to the frequency error 24 KHz) can not be detected, outputting a value not less than $\pi/4$ as the frequency error is considered as the excessive compensation.

Figure 5:
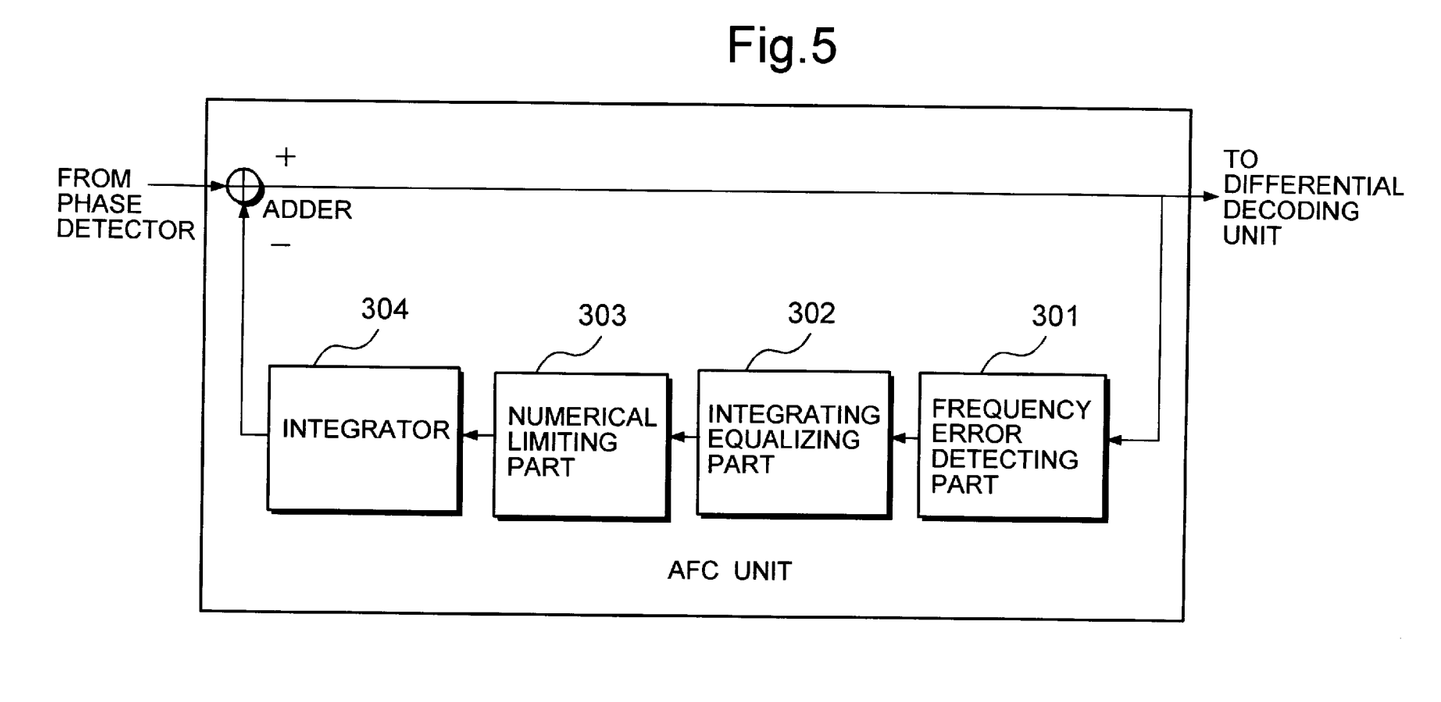
FIG. 5 is a block diagram showing another constitutional example of the AFC unit shown in FIG. 2.

FIG. 5 is a block diagram showing a constitutional example of another embodiment of the AFC unit used in the radio signal receiving apparatus of the present invention. The AFC unit shown as FIG. 5 has modified the AFC unit as shown in FIG. 3 to a feed-back type. The operation thereof is the same with that shown in FIG. 3 and can also correspond with the demodulating system shown in FIG. 2. Hence, even in the case of the embodiment shown in FIG. 5, the same effect with the case of the embodiment shown in FIG. 3 can be obtained.

As described above, in each of the above described embodiments, the error rate characteristic of the receiving system can be improved by applying a limit to the output numerical value of the frequency error detecting part. Particularly when the receiving condition is bad or when the frequency error is large, it is effective.

In the above described embodiments, though the modulating system is defined as $\pi/4$ shift DQPSK, it is not necessarily limited to this system.

What is claimed is:

1. A radio signal receiving apparatus comprising:
an automatic frequency controller unit for compensating for a frequency error between a frequency used for signal modulation and a frequency to be used for signal demodulation by detecting the frequency error from a modulated signal and limiting the detected frequency error within a predetermined range; and
a phase detector for converting the modulated signal into a base band phasing signal, wherein the automatic frequency controller unit detects the frequency error from the base band phasing signal,
the automatic frequency controller unit comprising:
a frequency error detecting part for detecting the frequency error from the base band phasing signal after being converted from the modulated signal by the phase detector;
an integrating and equalizing part for integrating and equalizing the frequency error detected by the frequency error detecting part; and
a numerical limiting part for limiting the frequency error integrated and equalized by the integrating and equalizing part within the predetermined range.

2. The radio signal receiving apparatus as claimed in claim 1, wherein, the automatic frequency controller unit further comprising:
an integrator for integrating the limited frequency error output from the numerical limiting part; and
a signal adder for subtracting the output signal of the integrator from the base band phasing signal after being converted from the modulated signal by the phase detector.

3. The radio signal receiving apparatus as claimed in claim 1, wherein the modulated signal is a signal modulated by a $\pi/4$ shift DQPSK (Differential Quadrature Phase Shift Keying) system and the numerical limiting part limits the frequency error within a phase shift range between $-\pi/4$ and $\pi/4$.

4. A radio signal receiving apparatus for receiving a radio signal modulated by a $\pi/4$ shift DQPSK (Differential Quadrature Phase Shift Keying) modulation system comprising:
a phase detector for converting the modulated signal into a base band phasing signal; and
an automatic frequency controller unit for compensating for a frequency error between a frequency used for signal modulation and a frequency to be used for signal demodulation by detecting the frequency error from the base band phasing signal output from the phase detector and limiting the detected frequency error within a phase shift range between $-\pi/4$ and $\pi/4$,
the automatic frequency controller unit comprising:
a frequency error detecting part for detecting the frequency error from the base band phasing signal after being converted from the modulated signal by the phase detector;
an integrating and equalizing part for integrating and equalizing the frequency error detected by the frequency error detecting part;
a numerical limiting part for limiting the frequency error integrated and equalized by the integrating and equalizing part within the phase shift range between $-\pi/4$ and $\pi/4$;
an integrator for integrating the limited frequency error output from the numerical limiting part; and
a signal adder for subtracting the output signal of the integrator from the base band phasing signal after being converted from the modulated signal by the phase detector.

5. The radio signal receiving apparatus as claimed in claim 4, wherein, the frequency error detecting part delays the base band phasing signal by one symbol only and detects the frequency error based on the difference between an input base band phasing signal and the base band phasing signal of one symbol ahead.

6. A method of radio signal reception by a radio signal receiving apparatus provided with an automatic frequency controller unit for compensating for a frequency error between a frequency used for signal modulation and a frequency to be used for signal demodulation, said method comprising:

converting a received modulated signal into a base band phasing signal;

delaying the base band phasing signal by one symbol, and detecting the frequency error based on the difference between the base band phasing signal and the base band phasing signal of one symbol ahead;

limiting the detected frequency error within a predetermined range; and subtracting the limited frequency error from the base band phasing signal.

* * * * *